May 4, 1954     M. C. SHAW ET AL     2,677,190

INTERNAL MEASURING GAUGE WITH A RING

Filed Jan. 10, 1952

INVENTORS
Milton C. Shaw
Charles D. Strang, Jr.

BY Ralph L. Chappell

ATTORNEY

Patented May 4, 1954

2,677,190

UNITED STATES PATENT OFFICE 2,677,190

INTERNAL MEASURING GAUGE WITH A RING

Milton C. Shaw, Lexington, Mass., and Charles D. Strang, Jr., Fond du Lac, Wis.

Original application August 24, 1945, Serial No. 612,520. Divided and this application January 10, 1952, Serial No. 265,913

3 Claims. (Cl. 33—178)

(Granted under Title 35, U. S. Code (1952), sec. 266)

This invention relates to measuring gages. This is a divisional application of our pending application Serial No. 612,520 which was filed on August 24, 1945, and is now abandoned.

An object of this invention is to provide a ring dynamometer with mechanically operative means of stressing it in such direction as to expand the ring; and electrical means of detecting and measuring the strain of the ring so that the amount of enlargement of the ring may be used to determine the inside dimension of a cylinder or other work piece which is provided with a circular opening.

Ancillary objects will become apparent in following the description of the illustrated form of the invention.

It is to be understood that the term "ring" is used herein in a broad sense to comprehend a closed, continuous, curved beam of any configuration or cross-section. In the illustrated embodiment, a ring of circular configuration is used, since it represents the most simple and most easily fabricated of all dynamometer ring structures. Also, the term "wire" as used herein, comprehends a ribbon, sheet, bar or any other form or configuration of strain-sensitive means.

Figure 1:
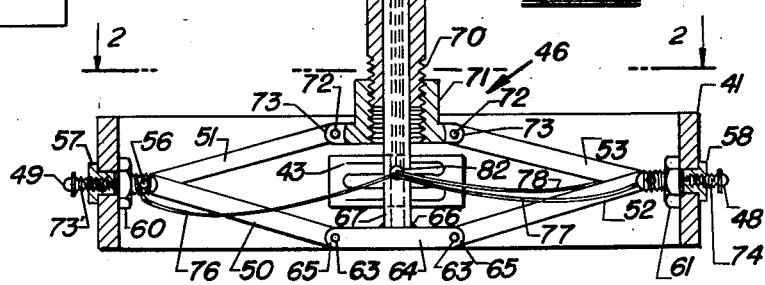
Fig. 1 is a longitudinal sectional view of the device, portions being shown in elevation.

One of the difficulties commonly met in the use of strain measuring elements is the effect of a temperature differential between the respective arms of the electrical bridge circuit. This results in a change of resistance with an accompanying change of force or displacement of the measuring system—a condition referred to as zero drift. In order that zero drift be completely eliminated, it is essential that the pairs of strain measuring elements or gages 42, 43 and 44, 45 be kept at the same temperature. This is conveniently accomplished by placing adjacent bridge elements on adjacent surfaces of the dynamometer rings as shown in Fig. 1. Furthermore, the use of a closed ring of symmetrical design provides equal parallel paths from equally spaced points, thus tending to keep all strain gages at the same temperature level. Numerous dynamometer rings constructed in the manner of the foregoing description have proved to be completely free of zero drift when operated under a wide range of temperature conditions, even though the gages employed were constructed of wire having a high change in resistance with temperature.

Figure 2:
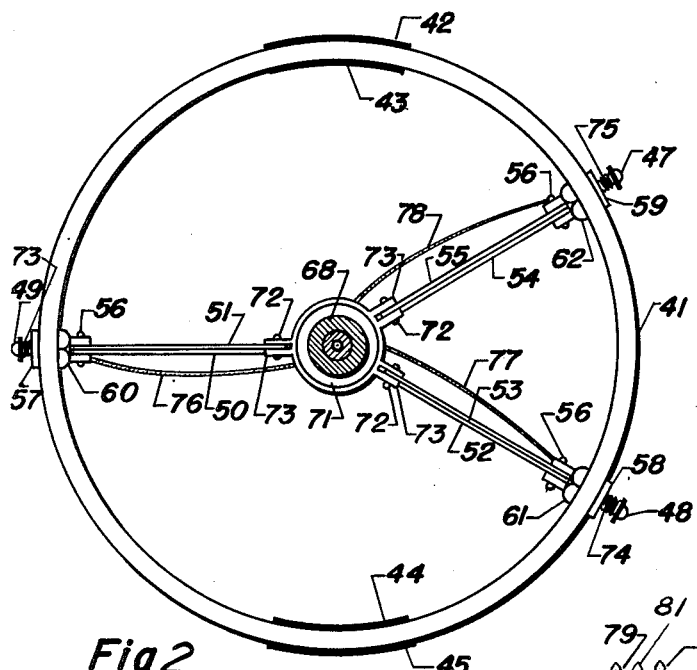
Fig. 2 is a transverse sectional view taken on the plane of line 2—2 of Fig. 1 and in the direction of the arrows.
Figure 3:
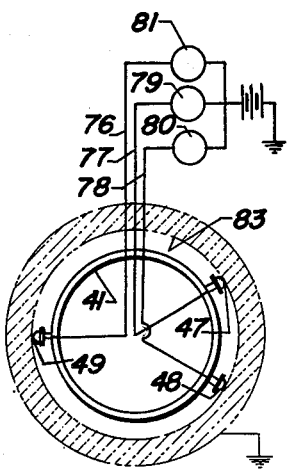
Fig. 3 is a wiring diagram of the lamp indicating circuit of the device of Fig. 1 as applied while measuring a cylinder bore.
Figure 4:
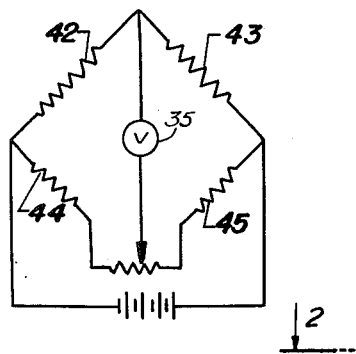
Fig. 4 is a wiring diagram of the strain gage indicating circuit.

By employing four active strain measuring elements as the respective arms in the electrical bridge circuit as shown in Fig. 4, maximum change of resistance and therefore maximum strain measuring sensitivity is obtained. In addition to the foregoing advantages embracing temperature compensation and maximum strain measuring sensitivity, a closed continuous curved beam is convenient, compact and easily applied to the measurement of forces and linear displacement. By proper choice of material and range of operation, the output of the bridge circuit may be made to vary linearly with the applied force or linear displacement.

A dynamometer ring 41 of elastic material, preferably metal, is provided with pairs of strain-sensitive wire gages 42, 43 and 44, 45, the gages 43 and 44 being on the inner surface of the ring 41 while the gages 42 and 45 are on the outer surface thereof. Each gage is held in place by a standard means, as cement, and the gages constitute arms of a Wheatstone bridge circuit as disclosed in Fig. 4 and also in our copending application, Serial No. 612,520.

A ring expanding toggle assembly 46 is employed to deform the ring 41 until contact points 47, 48 and 49 touch the internal surface to be measured. The previously calibrated change in resistance of the strain gages on the dynamometer ring is a measure of the diameter of the bore.

In detail, the toggle 46 consists of there pairs of arms 50 and 51, 52 and 53, and 54 and 55. One end of each of said pairs is pin connected at 56 to the radially disposed bolts 57, 58 and 59, respectively, passing through openings in the ring 41. The ends of these bolts are slotted to receive the outer ends of the toggle arms in pin connection therewith, and nuts 60, 61 and 62 lock the bolts to the ring 41. The inner ends of arms 50, 52, and 54 are pin connected at 63 to a collar 64 provided with suitable lugs 65 for the reception thereof. The collar 64 is rigidly fixed, as by welding 66, to a hollow shaft 67 coaxially positioned therewith, and a sleeve 68 is coaxially positioned around shaft 67 and is engaged therewith by threads 69. The lower end of the sleeve 68 is differentially threaded as at 70, relative to threads 69, and receives a collar 71 in threaded engagement therewith. Toggle arms 51, 53 and 55 are pin connected at 72 to the collar 71 which is provided with lugs 73 for the reception of these arms. The top ends of shaft 67 and sleeve 68 are enlarged and knurled to provide a finger grip, and on the top of the shaft 67 there are mounted electric lamps 79, 80 and 81.

The bolts 57, 58 and 59 are axially bored and threaded to receive non-conducting fixtures 73', 74 and 75, to the end of which are fastened contacts 49, 48 and 47, respectively. Conductors 76, 78 and 77 electrically connect lamps 81, 79 and 80 to contacts 49, 47 and 48, respectively, and the conductors are passed through the hollow shaft 67 and a lateral outlet aperture 82 in the lower end of the shaft 67.

In operation, the internal measuring device is calibrated against standard gage blocks. The measuring device, as a unit, is inserted into a cylinder bore or other hole 83 to be measured, and expanded by means of the differential screw toggle 46 until contact of the points 49, 48 and 47 with the inner periphery of the bore 83 is indicated by the lamps 81, 80 and 79. As the ring 41 is thus stressed and hence deformed, the amount of strain or deformation is transmitted to the wire gages 42, 43 and 44, 45. But since these gages are arms of the Wheatstone bridge in the balanced circuit (Fig. 4), a direct reading may be taken from the potential responsive indicating device 35, which may be calibrated to indicate diameter, circumference and radius of the bore, or one or a pair of these dimensions.

Since numerous modifications may be made without departing from the inventive concept, limitation is sought only in accordance with the scope of the following claims.

The invention described herein may be manufactured and used by or for the Government of the United States of America for governmental purposes without the payment of any royalties thereon or therefor.

We claim:

1. In an inside dimension measuring device, the combination of an elastic closed ring provided with strain-sensitive gages on the inner and outer surfaces thereof, a balanced circuit having a bridge of which said gages constitute arms, means for stressing said ring in such direction as to increase the diameter thereof to thereby strain said ring whereby said gages detect the amount of said strain, said means including a pair of coaxial elements axially movably connected together, arms pivoted at their outer ends to said ring, means connecting the inner ends of certain of said arms to one of said coaxial elements, means connecting the inner ends of the remaining arms to the other of said coaxial elements, contacts carried by said closed ring and projecting outwardly of the outer surface thereof so that the contacts are adapted to touch the work piece retaining said ring spaced from the work piece, insulating means between said contacts and said ring, and electrically operative indicators connected with said contacts to inform of the touching of a work piece by the contacts.

2. The combination of claim 1 and; said indicators being disposed on one of said coaxial elements and movable therewith.

3. The combination of claim 2, and; said one of said elements having a passage extending axially therethrough, electrical conductors extending through said passage and connected to said contacts and to said indicators.

References Cited in the file of this patent

UNITED STATES PATENTS

| Number | Name | Date |
|---|---|---|
| 1,436,355 | Parker | Nov. 21, 1922 |
| 1,958,864 | Richardson | May 15, 1934 |
| 2,316,975 | Ruge | Apr. 20, 1943 |
| 2,445,068 | Jackson | July 13, 1948 |
| 2,566,970 | Swensson | Sept. 4, 1951 |
| 2,569,949 | Prescott | Oct. 2, 1951 |

FOREIGN PATENTS

| Number | Country | Date |
|---|---|---|
| 4,190 | Austria | May 25, 1901 |

OTHER REFERENCES

Theis, publication "Aircraft Engineering," April 1943, pages 106–109, of record in parent application, S. N. 612,520.